United States Patent
Rodriguez et al.

(10) Patent No.: US 11,674,199 B2
(45) Date of Patent: Jun. 13, 2023

(54) PYROMETALLURGICAL METHOD FOR OBTAINING COMPOUNDS OF LITHIUM AND INTERMEDIATES FROM ALPHA-SPODUMENE AND LEPIDOLITE

(71) Applicants: CONSEJO NACIONAL DE INVESTIGACIONES CIENTIFICAS Y TECNICAS CONICET, Buenos Aires (AR); UNIVERSIDAD NACIONAL DE CUYO, Mendoza (AR)

(72) Inventors: Mario Humberto Rodriguez, Lujan de Cuyo (AR); Alexander Cristian Resentera Beiza, Mendoza (AR); Gustavo Daniel Rosales, Godoy Cruz (AR)

(73) Assignees: CONSEJO NACIONAL DE INVESTIGACIONES CIENTIFICAS Y TECNICAS CONICTE, Buenos Aires (AR); UNIVERSIDAD NACIONAL DE CUYO, Mendoza (AR)

( * ) Notice: Subject to any disclaimer, the term of this patent is extended or adjusted under 35 U.S.C. 154(b) by 378 days.

(21) Appl. No.: 16/766,247

(22) PCT Filed: Nov. 23, 2018

(86) PCT No.: PCT/IB2018/059265
§ 371 (c)(1),
(2) Date: May 21, 2020

(87) PCT Pub. No.: WO2019/102416
PCT Pub. Date: May 31, 2019

(65) Prior Publication Data
US 2020/0325557 A1    Oct. 15, 2020

(30) Foreign Application Priority Data

Nov. 24, 2017    (AR) .............................. 20170103282

(51) Int. Cl.
$C22B\ 26/12$ (2006.01)
$C01D\ 15/04$ (2006.01)
$C22B\ 3/08$ (2006.01)

(52) U.S. Cl.
CPC .............. C22B 26/12 (2013.01); C01D 15/04 (2013.01); C22B 3/08 (2013.01)

(58) Field of Classification Search
CPC .. C22B 26/12; C22B 3/08; C22B 1/02; C01D 15/04; Y02P 10/20; C01P 2002/72; C01P 2002/88
(Continued)

(56) References Cited

U.S. PATENT DOCUMENTS

2017/0022068 A1\*  1/2017  Rodriguez ................ C22B 3/06

FOREIGN PATENT DOCUMENTS

| CN | 102690961 A | 9/2012 |
|---|---|---|
| CN | 104817099 A | 8/2015 |

(Continued)

OTHER PUBLICATIONS

CN102690961A Translation (Year: 2012).\*
(Continued)

*Primary Examiner* — Brian D Walck
*Assistant Examiner* — Danielle Carda
(74) *Attorney, Agent, or Firm* — Womble Bond Dickinson (US) LLP (57) ABSTRACT

Pyrometallurgic process for obtaining lithium compounds and intermediates, the process being characterized by comprising the steps of a) contacting lithium aluminosilicate particles with at least a fluorine solid compound, b) heating
(Continued)

until a temperature of 25 to 900° C. obtaining a solid mixture and c) carrying out at least a leaching process of the mixture in step b).

7 Claims, 12 Drawing Sheets

(58) Field of Classification Search
USPC .......................................................... 423/116
See application file for complete search history.

(56) References Cited

FOREIGN PATENT DOCUMENTS

| | | |
|---|---|---|
| CN | 107265485 A | 10/2017 |
| WO | 2015/155684 A2 | 10/2015 |

OTHER PUBLICATIONS

CN 107265485A Translation (Year: 2017).*
International Preliminary Report on Patentability (Chapter II) received for PCT Patent Application No. PCT/IB2018/059265, dated Feb. 5, 2020, 21 pages (6 pages of English Translation and 15 pages of Origina Document).
International Search Report and Written Opinion received for PCT Patent Application No. PCT/IB2018/059265, dated Feb. 18, 2019, 13 pages (7 pages of English Translation and 6 pages of Original Document).

* cited by examiner

PYROMETALLURGICAL METHOD FOR OBTAINING COMPOUNDS OF LITHIUM AND INTERMEDIATES FROM ALPHA-SPODUMENE AND LEPIDOLITE

FIELD OF THE INVENTION

The present invention refers to a process for obtaining lithium compounds and intermediates by a solid-solid pyrometallurgical reaction.

BACKGROUND OF THE INVENTION

Lithium can be found in numerous minerals, owing to its great chemical reactivity, notwithstanding, there are very few natural sources of this metal which are commercially useful, spodumene being the most important. This mineral occurs in a natural phase known as α-spodumene which scarcely reactive to traditional chemical agents; however, at temperatures above 1,000° C., undergoes an irreversible change to a β-spodumene phase which is more reactive. In the Argentine Republic, the main spodumene deposits are found in the Salta, San Luis and Cordoba provinces.

An exhaustive bibliography revision allowed determining that there are numerous papers and patents dealing with spodumene mineral processes in autoclave at temperatures close to 250° C. Other authors suggest combining of pyro and hydrometallurgical processes, performing first a β-spodumene calcination with some of these Na salts ($Na_2CO_3$, NaCl, $Na_2SO_4$) and, subsequently dissolving the mixture obtained in water, always aiming at producing lithium carbonate or fluoride. Please note that in all the processes mentioned above, β-spodumene is used, with a very high consumption of energy which the transformation from the natural phase demands to the current one and the residues generated from the other elements found in the mineral (Al and Si) are not exploited, remaining as environmental passives.

SUMMARY OF THE INVENTION

The importance of this invention is based on working with "α-spodumene" mineral natural phase by a solid-solid reaction of at least lithium aluminosilicate with at least a fluorine solide compound (e.g., "α-spodumene-NaF", "α-spodumene-KF", "α-spodumene-$NH_4HF_2$", "lepidolite-NaF", "lepidolite-KF" and "lepidolite-$NH_4HF_2$" at a temperature between 25 and 900° C., preferably between 120 and 900° C., producing completer rupture of the mineral structure and producing high purity albite, nepheline, leucite, silica, aluminum fluoride and lithium fluoride. Please note that this (solid-solid) process minimizes production of contaminating gases and that these can be efficiently treated by adequate systems. Further, this process carries out a complete use of the elements comprised in the mineral as, by forming albite, nepheline, leucite, silica and aluminum fluoride, both aluminum and silica can be used, therefore, avoiding generating environmental passives, as is in the case of the currently used industrial process to obtain lithium carbonate.

Albite and nepheline are minerals mainly used as raw material for glass manufacture and in the ceramic industry, owing to their low melting point and high purity. A recent application of these minerals is used thereof as absorbent agents of heavy metals in natural waters and in gold recovery metallurgy, being a viable alternative to the current process which uses cyanide as the extracting agent for this element. Leucite is one of the most used minerals in manufacturing dental ceramics as it has a high thermal expansion coefficient, property that is transmitted to the ceramic materials manufactured with this compound. On the one hand, this feature allows for its association with the majority of metals used in dental prosthesis. Amorphous silica nanoparticles have various applications such as absorbents and silica-based selective absorbents, active phase carriers in manufacturing catalyst agents, reinforcing polymeric system fibers, thickeners in dispersing environments, binder for preparing multiphase materials, columns for gas chromatography, among others. On the other hand, aluminum fluoride is used as a flux in the aluminum electrolysis production process.

LIF is used as a flux in ceramic and glass industry and in light metal weld. It is also used in preparing optical components for chemical analysis equipment (IR and UV spectroscopy). One of the most recent applications is in manufacturing of the new cathodes for LiF—Fe type batteries. A potentially important use of LiF is represented by atomic fusion where it is used as a source to obtain isotope $^6Li$, which later is transformed into tritium, and this fuses with deuterium to form helium, both reactions produce a great quantity of caloric energy. Moreover, LiF can be converted by different chemical ways into other commercial products of this element, such as $Li_2CO_3$, LiOH and LiCl, having a current great demand.

DESCRIPTION OF THE DRAWINGS

For greater clarity and comprehension of the present invention, it has been illustrated with various figures, wherein the preferred embodiment has been represented, as an example, wherein.

DETAILED DESCRIPTION OF THE EMBODIMENT EXAMPLE

For the direct fluoridation process of lithium aluminosilicates for lithium fluoride synthesis, the following tests are described:

Calcination Test

7 g of α-spodumene, or lepidolite with NaF, KF or $NH_4HF_2$ mixtures at different molar ratio were prepared for the experimental tests in a manual mortar during 5 minutes. Each mixture was placed in a porcelain crucible and calcined in a muffle with temperature control between 120 and 900° C. Next the calcined solid was pulverized in a manual mortar during 5 minutes. Then, 2 g therein were leached during an hour with distilled water at 25° c. in a PVC reactor with continuous stirring. Finally the leaching solution was filtered and dried to be analyzed.

The extraction reaction was quantified by calculating the amount of XF (X: Na o K o $NH_4$) that reacts with the mineral using the following equation:

$$XF_{(C)} - XF_{(L)} = XF_{(R)} \quad (1)$$

wherein
$XF_{(C)}$: Amount of calcined XF.
$XF_{(L)}$: Amount of XF in the leaching
$XF_{(R)}$: Amount of XF reacting with the mineral
Using the amount of reacted XF, according to equation (2.a), allows to calculate the amount of Li extracted from the mineral.

From the thermodynamic analysis results the following reactions are provided for the different reaction systems:

$$LiAlSi_2O_6 + NaF \rightarrow LiF + NaAlSi_2O_6 \quad (2.a)$$

$$2NaAlSi_2O_6 \rightarrow NaAlSi_3O_8 + NaAlSiO_4 \quad (2.b)$$

$$NaAlSi_3O_8 + NaAlSiO_4 + 2SiO_2 \quad (2.c)$$

$$LiAlSi_2O_6 + KF \rightarrow LiF + KAlSi_2O_6 \quad (3)$$

$$Li_2O.Al_2O_3.4SiO_2 + 19(NH_4)HF_2 \rightarrow 2LiF + 4(NH_4)_2SiF_6 + 2(NH_4)_3AlF_6 + 5NH_3 + 12H_2O \quad (4.a)$$

$$(NH_4)_3AlF_6 \rightarrow AlF_3 + 3NH_4F \quad (4.b)$$

Effect of the α-spodumene:NaF temperature

Figure 1A:
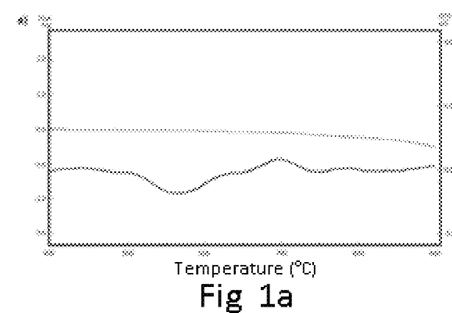
FIG. 1a) illustrates the DT-FGA curve of the α-spodumene:NaF mixture in molar ratio 1:1.5.
Figure 1B:
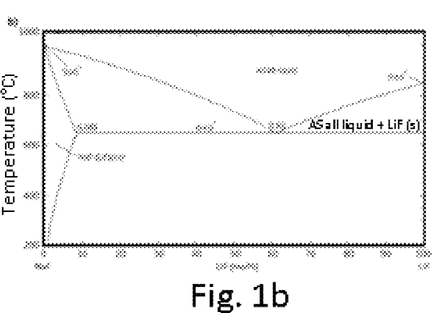
FIG. 1b) shows a phase diagram for the NaF—LiF mixture.
Figure 2:
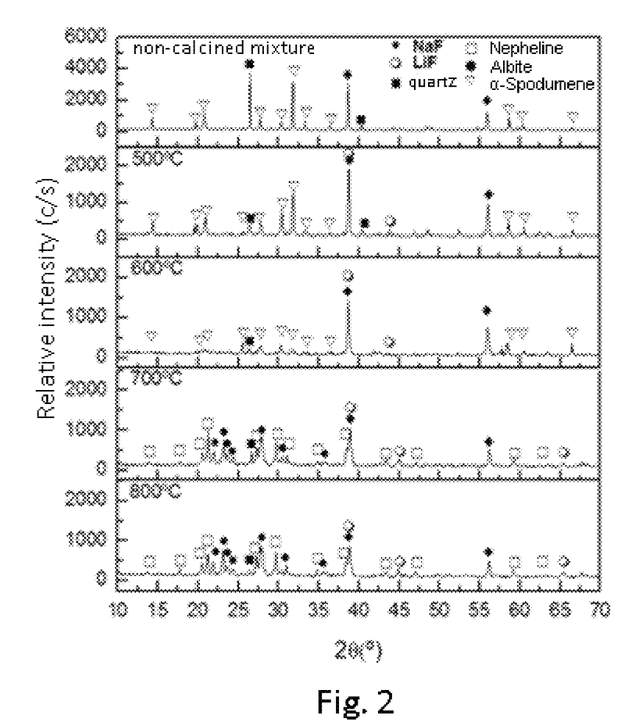
FIG. 2 shows the X-ray diffractograms. a) α-spodumene:NaF mixture in molar ratio 1:2. b) calcined at ratio 1:2 at 500° C., 120 min. c) calcined at ratio 1:2 at 800° C., 120 min.

In FIG. 1 differential thermal analysis results have been shown, wherein the endothermic peak noted between 500 and 600° C. is due to the beginning of the reaction between the mineral and NaF, while the exothermic peak noted between 650 and 750° C. matches with formation of an eutectic between NaF and (generated) LiF, FIG. 1b The comparative results of DRX analysis of the non-calcined mixture and those calcined at 500, 600, 700 and 800° C. are shown in FIG. 2. In FIG. 2a the diffraction pattern is noted corresponding to α-spodumene (JCPDS 33-0786) and sodium fluoride (ICDD 01-088-2299) and quartz (JCPDS 33-1161) present as a bargain. In the calcined mixtures at 500 and 600° C. (FIGS. 2b and c) a decrease can be noticed in the intensity of the diffraction lines of α-spodumene, relative to diffractogram of the non-reacted mixture, which would indicate the beginning of the mineral reaction. In FIG. 2d) and e), corresponding to 700 and 800° C. the nearly complete disappearance can be noticed of α-spodumene phase and formation of LiF, albite ($NaASi_3O_8$), and nepheline ($NaAlSiO_4$). This data confirms the proposed reactions by thermodynamic study.

Effect of the α-Spodumene:KF Temperature

The study carried out on the temperature on the thermodynamic behavior of the α-spodumene:KF system was performed with the HSC Chemistry 5.11 program. The results are shown in FIG. 3.

Figure 3:
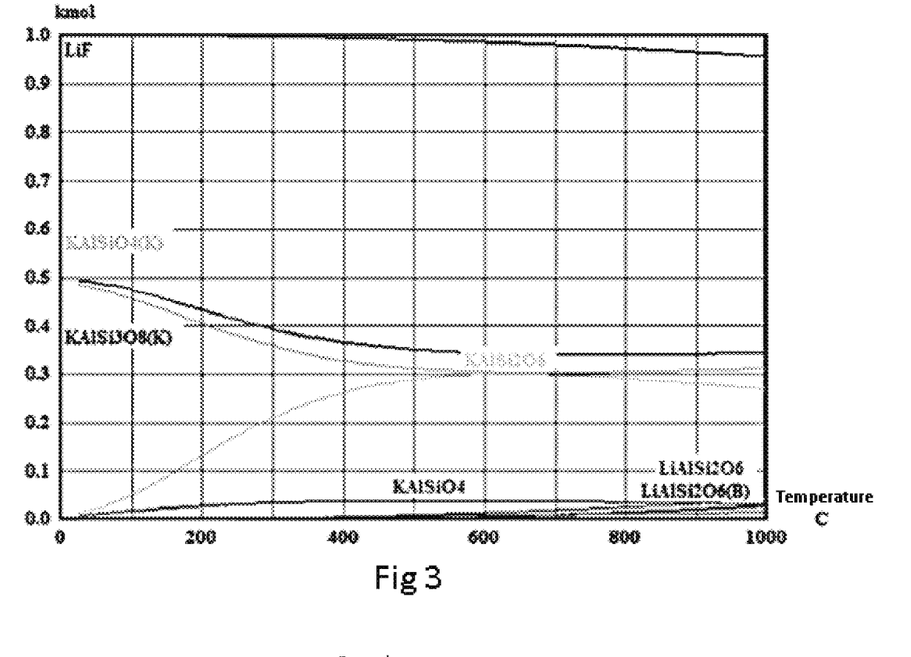
FIG. 3 shows the effect of temperature of the α-spodumene:KF system.

From FIG. 3 one can infer that the reaction is thermodynamically favored in all the proposed temperature ranges (25-800° C.) with conditions of maximum extraction in the range corresponding between 600 and 800° C.

Figure 4:
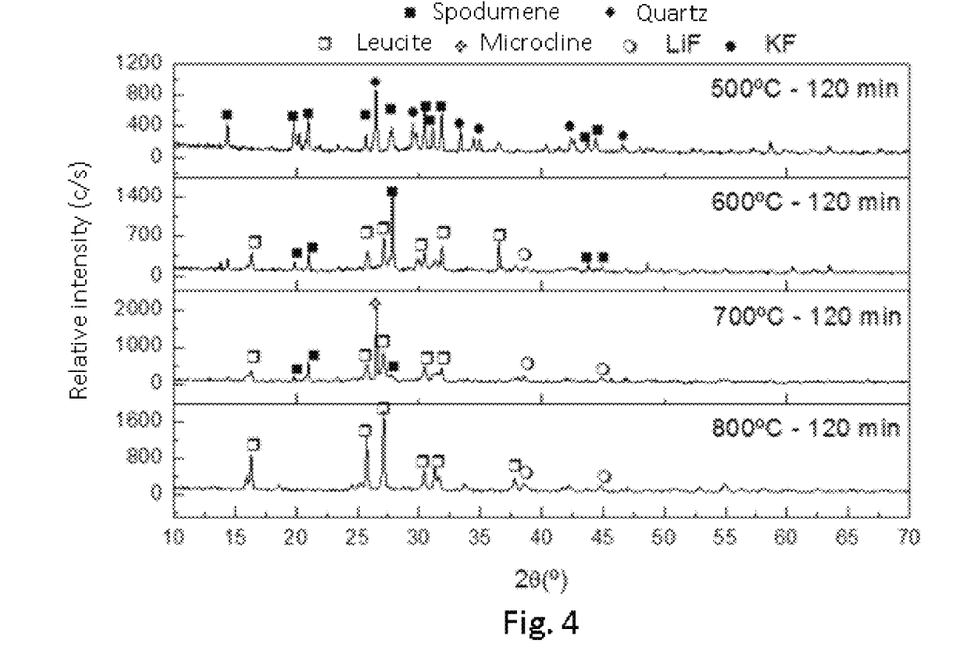
FIG. 4 shows X-ray diffractograms. a) Calcined in molar ratio 1:2 at 500° C., 120 min. b) Calcined in ratio 1:2 at 600° C., 120 min. c) Calcined in ratio 1:2 at 700° C., 120 min. d) Calcined in ratio 1:2 at 800° C., 120 min.

FIG. 4 shows the diffractograms of the solids obtained. In the calcines mixtures at 500 and 600° C. (FIGS. 4b) and 4c)) a decrease in intensity of the α-spodumene diffraction lines can be observed, relative to the diffractogram of the non-reacted mixture, which would indicate the beginning of the mineral reaction. Further, from 600° C. appearance of leucite compound is detected. In FIG. 2d) and e), corresponding to 700 and 800° C. nearly complete of the disappearance of α-spodumene phase can be observed and formation of LiF and leucite ($KAlSi_2O_6$). This data confirms the proposed reactions by thermodynamic studies.

Effect of the α-Spodumene:NaF Molar Ratio

Figure 5:
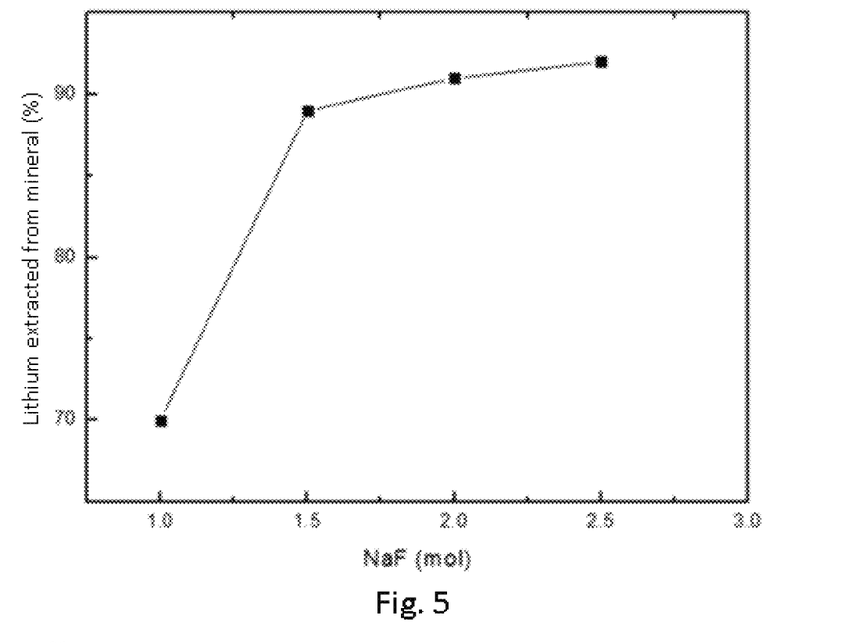
FIG. 5 shows the effect in molar ratio of α-spodumene:NaF during a 2 hs calcination at 700° C.
Figure 6:
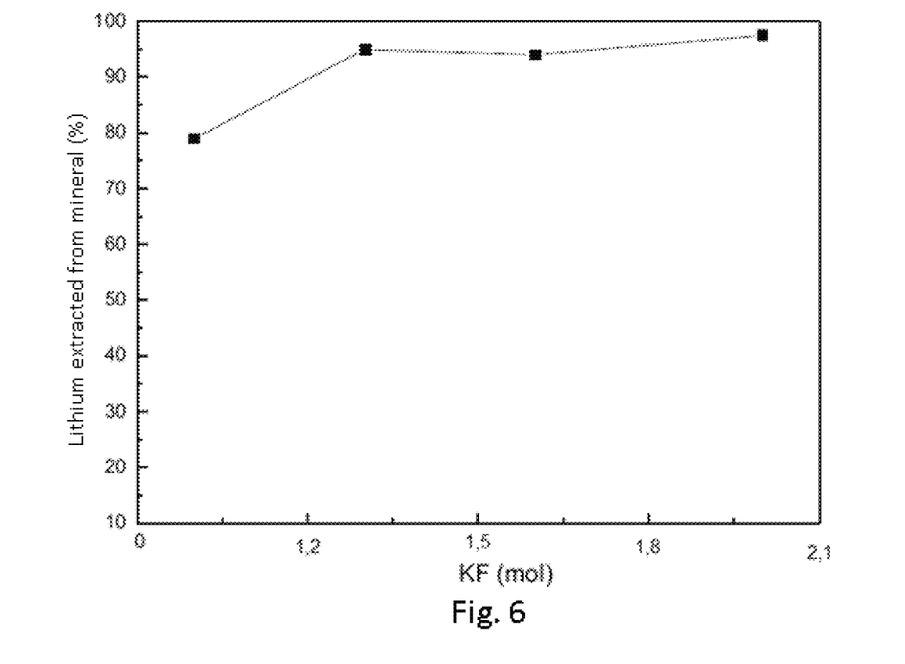
FIG. 6 shows the effect in molar ratio α-spodumene:KF during a 2 hs calcination at 700° C.

FIG. 5, shows the results obtained from studying the effect exerted addition of NaF on the mineral conversion. The α-spodumene:KF mixtures with molar ratios of 1:1, 1:1.3; 1:1.6 and 1:2 were calcined at 700° C. during 2 hours and then leached with water during an hour at 25° C. and constant stirring.

The curve shows that the higher Li extractions were reached which higher KF amounts to the stoichiometric relation raised in equation 3, obtaining extractions of 95 and 97% with molar ratios of 1:1.3 and 1:2, respectively.

Effect of α-Spodumene:NaF Calcination Time

Figure 7:
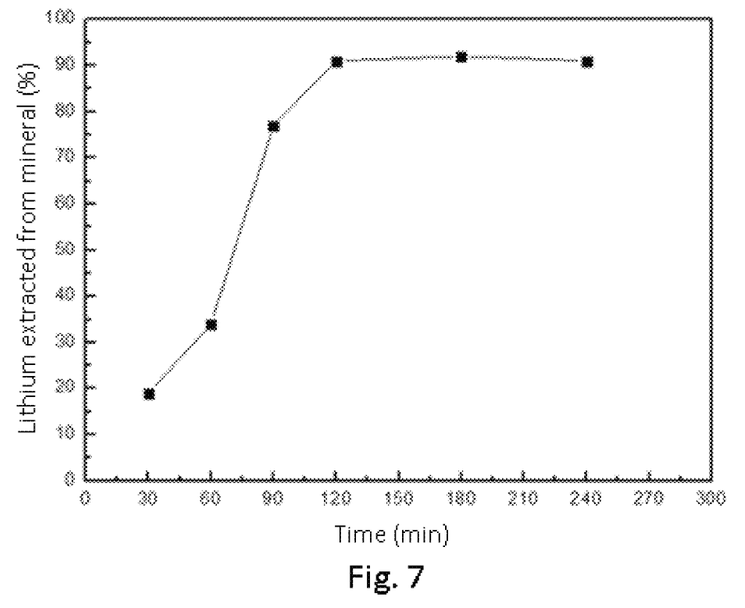
FIG. 7 shows the calcination time effect at 700° C. α-spodumene:NaF mixture in molar ratio 1:2.

The results obtained from studying the effect of calcination time on the mineral conversion with NaF, is shown in FIG. 7. The α-spodumene:NaF mixtures with molar ratio 1:2 were calcined at 700° C. during 30, 60, 90, 120, 180 and 240 minutes and later, leached with water during an hour at 25° C. and constant stirring.

The curve obtained shows that upon increasing the calcination time, an increase in the amount of extracted Li is produced; this can be explained taking into account that upon increasing the contact time between the solids favors the ionic exchange reaction between Na+ from NaF and Li+ of the mineral. Once having reached 120 min, this effect is nearly negligible.

Figure 8:
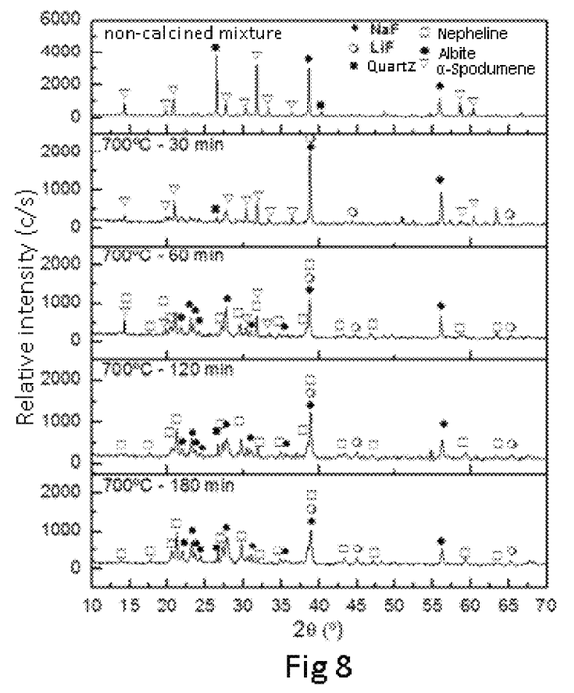
FIG. 8 shows X-ray diffractograms. a) α-spodumene:NaF mixture at molar ratio 1:2. b) Calcined at ratio 1:2 at 700° C., 30 min. c) Calcined at ratio 1:2 at 700° C., 60 min. d) Calcined at ratio 1:2 at 700° C., 180 min.

FIG. 8, comparatively shows the analysis results with DRX of the molar ratio 1:2 α-spodumene:NaF mixtures, without being calcined and calcined at 700° C. during 30, 60, 120 and 189 minutes. In the corresponding diffractogram to the mixture calcined for 30 minutes (FIG. 8b) one can notice a pronounced decrease in the intensity of the α-spodumene peaks as regards the non-reacted mixture (FIG. 8a) and appearance of the LiF corresponding diffraction pattern. In FIG. 8c) corresponding to 60 minutes calcination, the albite ($NaAlSi_3O_8$), nepheline ($NaAlSiO_4$) and lithium fluoride (LiF) phases can be noticed, with a decrease in the α-spodumene diffraction lines; while in FIG. 8d) and e) nearly complete disappearance of the α-spodumene phase can be seen, while the LiF, albite and nepheline phases show a greater intensity as regards their diffraction lines, indicating that the reaction of the mineral with NaF has been complete.

Effect of α-Spodumene:KF Calcination Time

Figure 9:
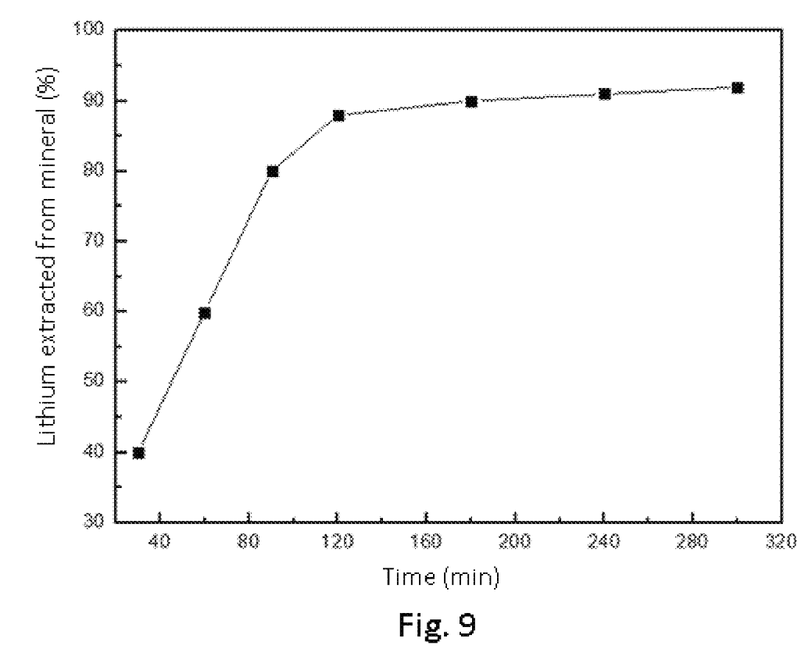
FIG. 9 shows the calcination time effect at 700° C. in α-spodumene:KF mixture at molar ratio 1:2.

The results obtained from studying the calcination time effect on the mineral conversion with KF is observed in FIG. 9. The α-spodumene:KF mixtures with molar ratio 1:2 were calcined at 700° C. during 30, 60, 90, 120, 180, 240 and 300 minutes and then leached with water during an hour at 25° C. and constant stirring.

The curve obtained shows that by increasing calcination time, an increase in the amount of extracted Li is produced, this can be explained taking into account that by increasing the contact time between the solids favors the ionic interchange reaction between K+ from KF and Li from the mineral. Once having reached 120 min, this effect is nearly negligible.

Effect of α-Spodumene:$NH_4HF_2$ Molar Ratio

Figure 10:
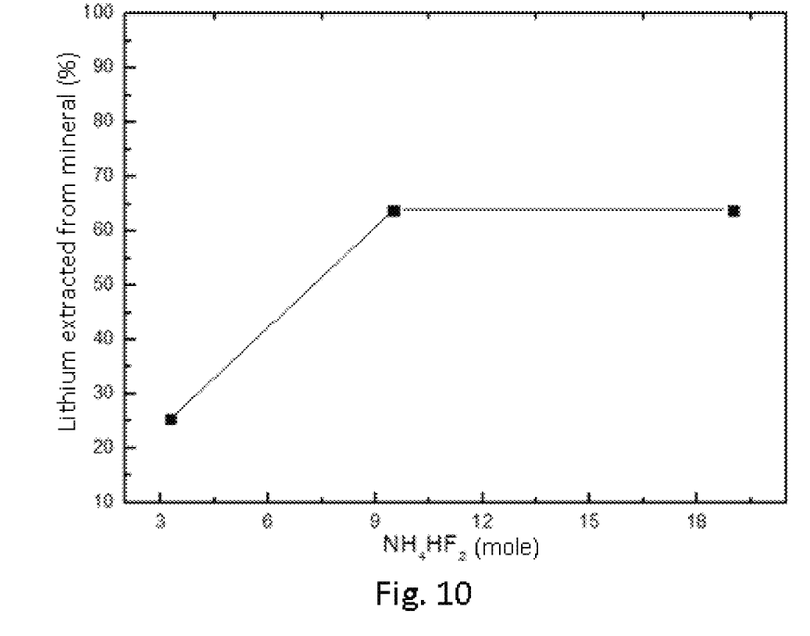
FIG. 10 shows the effect at molar ratio of α-spodumene:$NH_4HF_2$ during a 2 hs calcination at 230° C.

FIG. 10 shows the results obtained from studying the effect of adding $NH_4HF_2$ on the mineral conversion. The α-spodumene:$NH_4HF_2$ mixtures with molar ratios of 1:3.5; 1:9.5 and 1:19 were calcined at 230 during two hours and later, leached with water during one hour at 25° C.

The curve shows that the greater Li extractions were reached with amounts of $NH_4HF_2$ in the stoichiometric relationship raised in equation 4a, obtaining extractions of 65% with molar ratios of 1:9.5 and 1:19, respectively Li Extraction Tests From the results obtained in the previous step tests were carried out to extract Li from the α-spodumene:NaF or KF (molar ratio 1:2, 120 min, 700° C.) and α-spodumene: $NH_4HF_2$ (molar ratio 1:9.5, 120 min, 230° C.) samples. Please note that, these calcination conditions were selected as optimum for said step. Next, the results for the mineral with NaF mixture are shown.

The operative variables studied were, leaching agent, agent concentration and leaching time.

Effect of the Leaching Agent

From studying the effect that the leaching agent exert and the reaction time on Li extraction at different times, was carried out using the following working conditions: 300 ml leaching solution (total volume) and 14 g of α-spodumene: NaF (1:2) mixture, calcined at 700° C. during 120 min. The tested leaching agents were water and solutions of: $CaCl_2$ 0.09 M at pH7, $CaCl_2$ 0.09 M at pH 13 and $H_2SO_4$ at 10% v/v. The leaching time interval was from 30 to 240 min. The results of this study are shown in FIG. 10.

Figure 11:
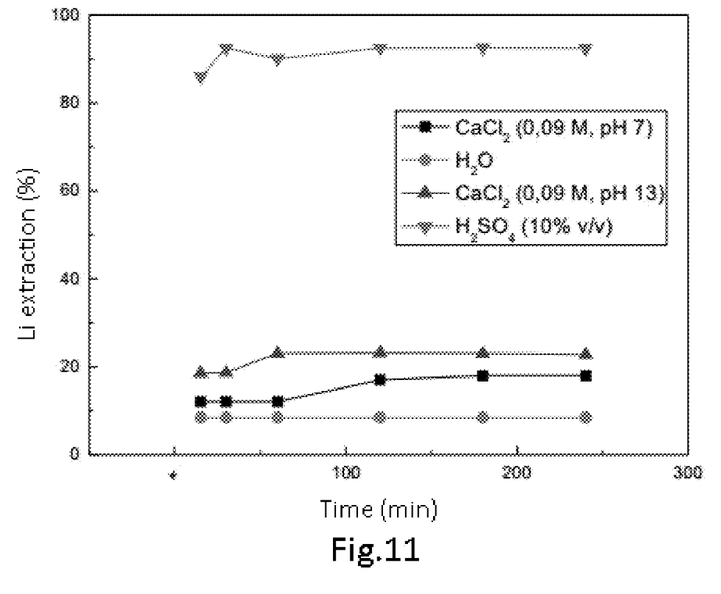
FIG. 11 shows the effect of the leaching agent on Li extraction at different times for the calcine obtained from the α-spodumene:NaF mixture at 700° C. during 2 hours with a molar ratio 1:2.

In FIG. 11 you may note that the best extraction values are reached using $H_2SO_4$ solutions, a strong difference is detected between tis one and the other agents used. The maximum extraction obtained was 92.5% working with $H_2SO_4$ at 10% v/v at a time of 90 min. in all the experiments we have noticed that the reaction time does not have a strong influence on the extraction reaction. From these results, $H_2SO_4$ was selected as the leaching agent for future studies.

Effect of the Leaching Agent Concentration

Investigation of $H_2SO_4$ concentration effect on Li extraction at different reaction times, was carried out using a total volume leaching solution of 300 ml and 14 g α-spodumene: NaF (1:2) mixture, calcined at 700° C. during 2 hours. The concentrations of leaching agent studied were: between 3, 5 and 10% v/v for a time interval compressed between 30 and 240 min. The results are shown in FIG. 12.

Figure 12:
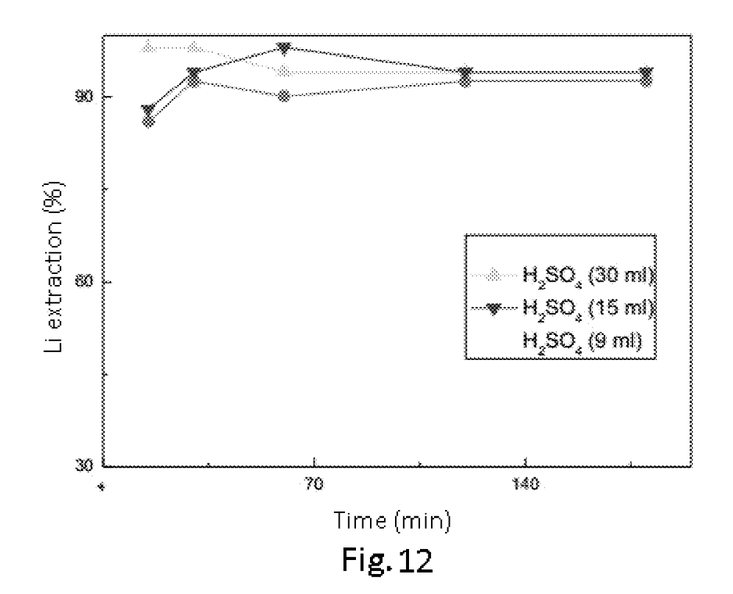
FIG. 12 shows the effect of $H_2SO_4$ on Li extraction for the calcine obtained from the α-spodumene:NaF mixture at 700° C. during 2 hours with a molar ratio 1:2.
Figure 13:
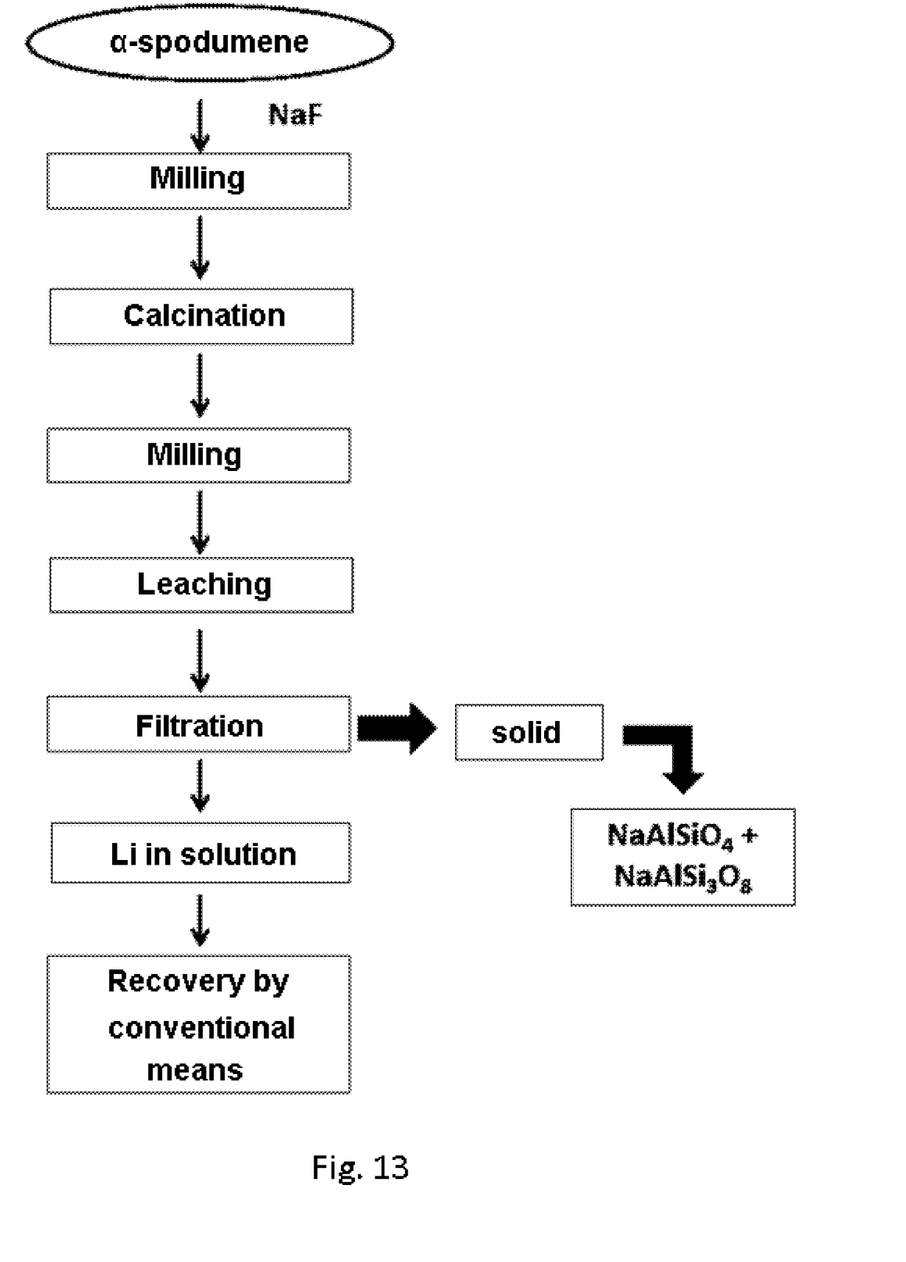
FIG. 13 shows the flow chart for the process using NaF with α-spodumene.
Figure 14:
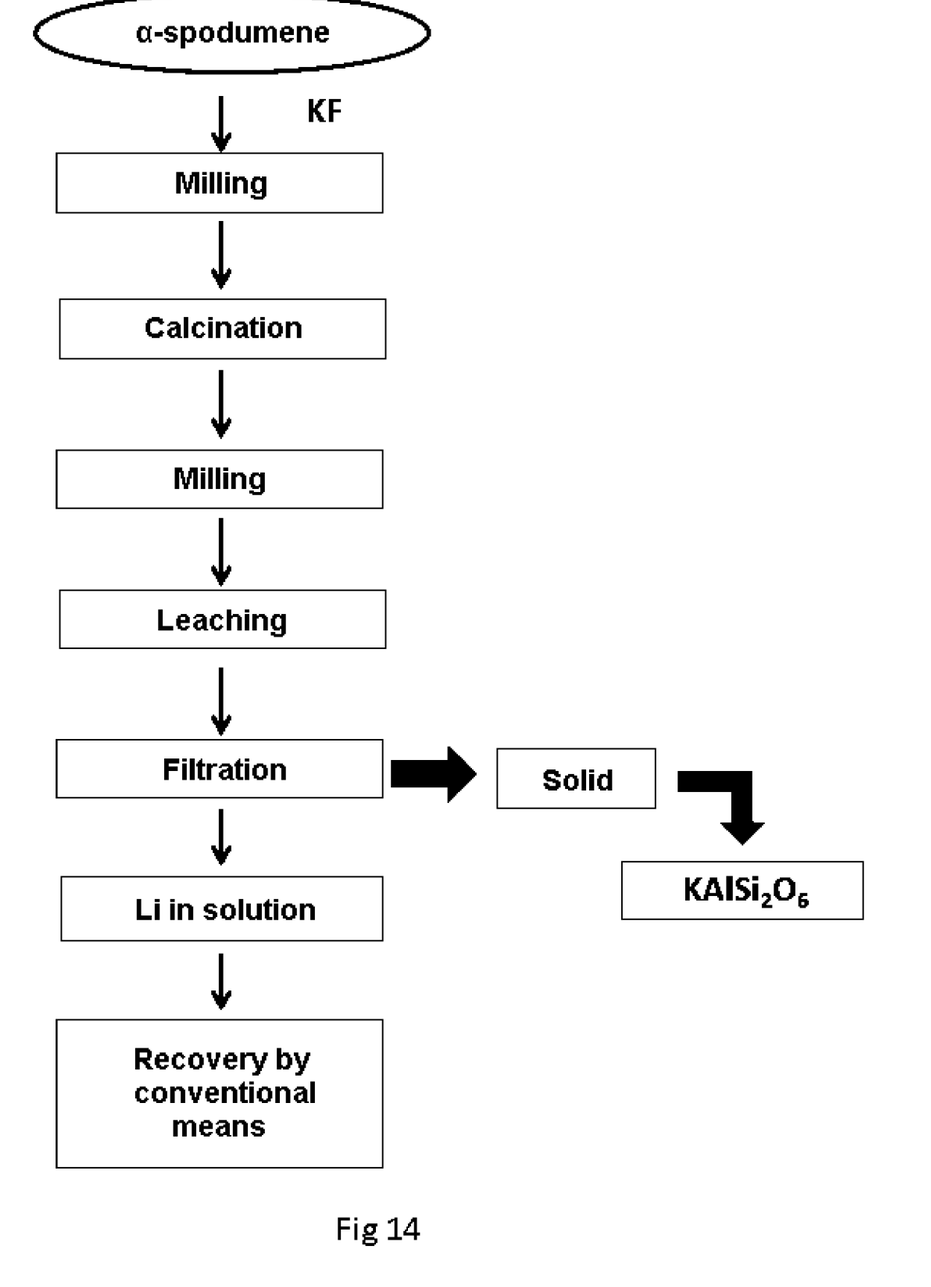
FIG. 14 shows the flow chart for the process using KF with α-spodumene.
Figure 15:
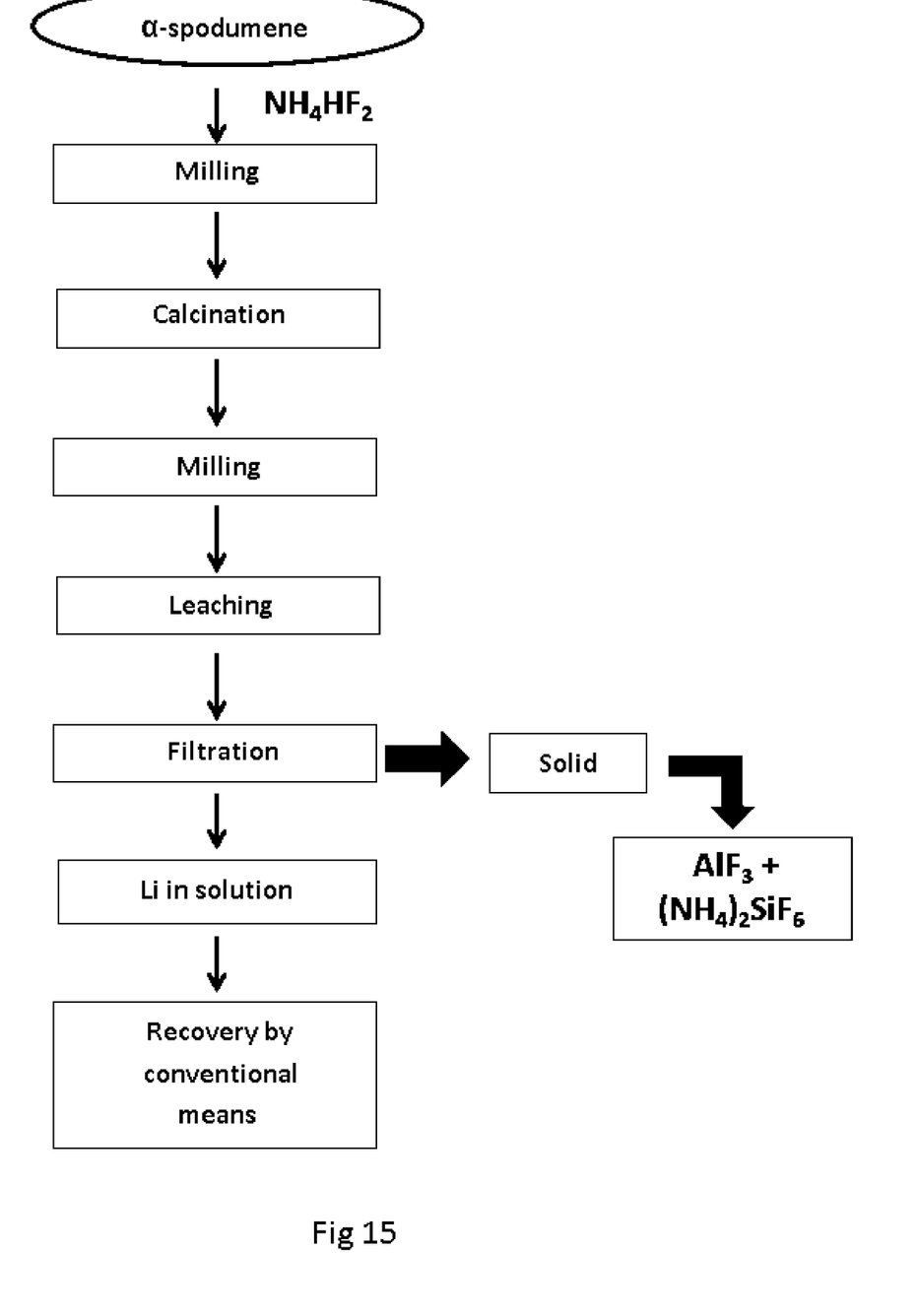
FIG. 15 shows the flow chart for the process using $(NH_4)HF_2$ with α-spodumene.
Figure 16:
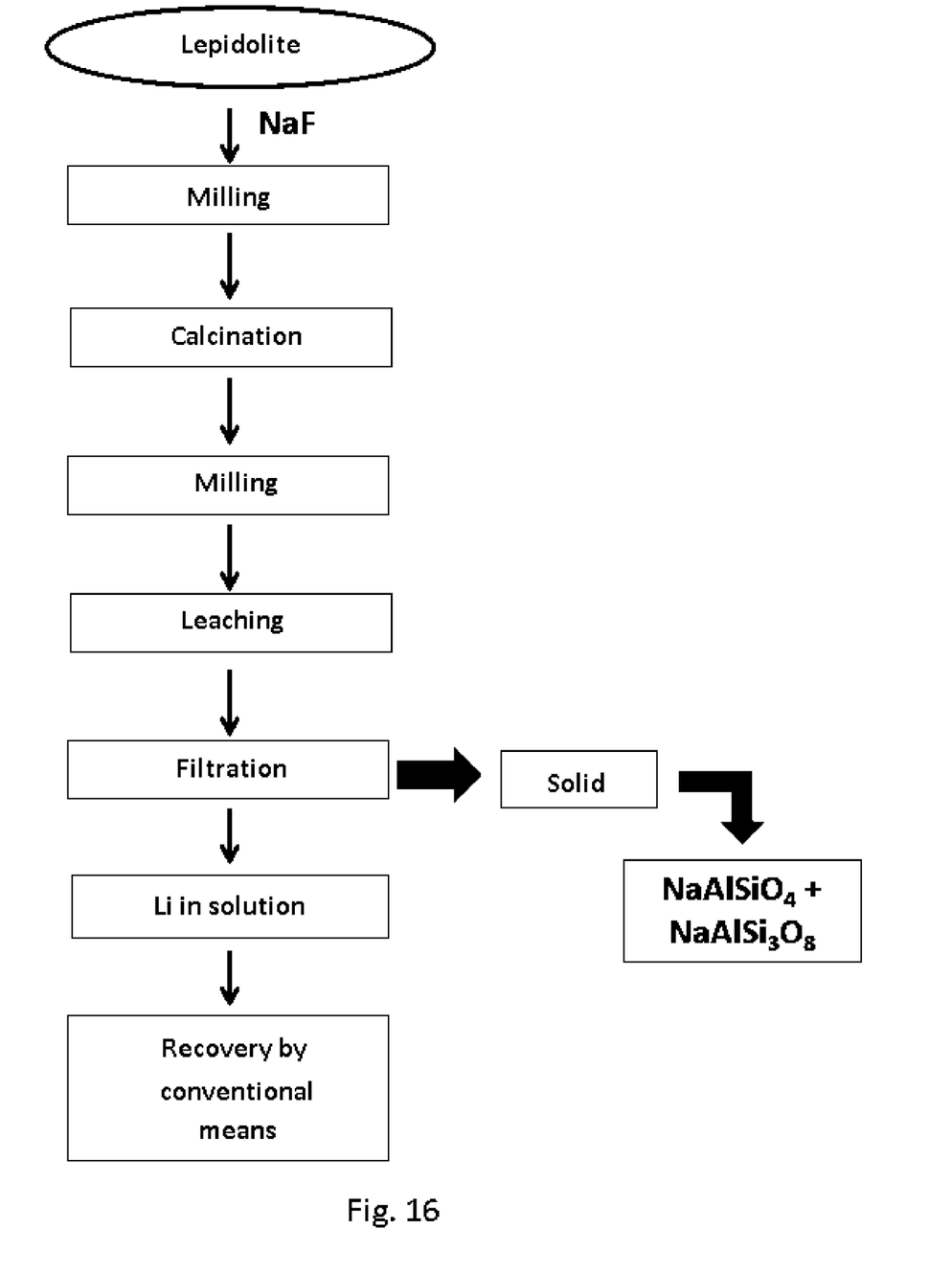
FIG. 16 shows the flow chart for the process using NaF with lepidolite.
Figure 17:
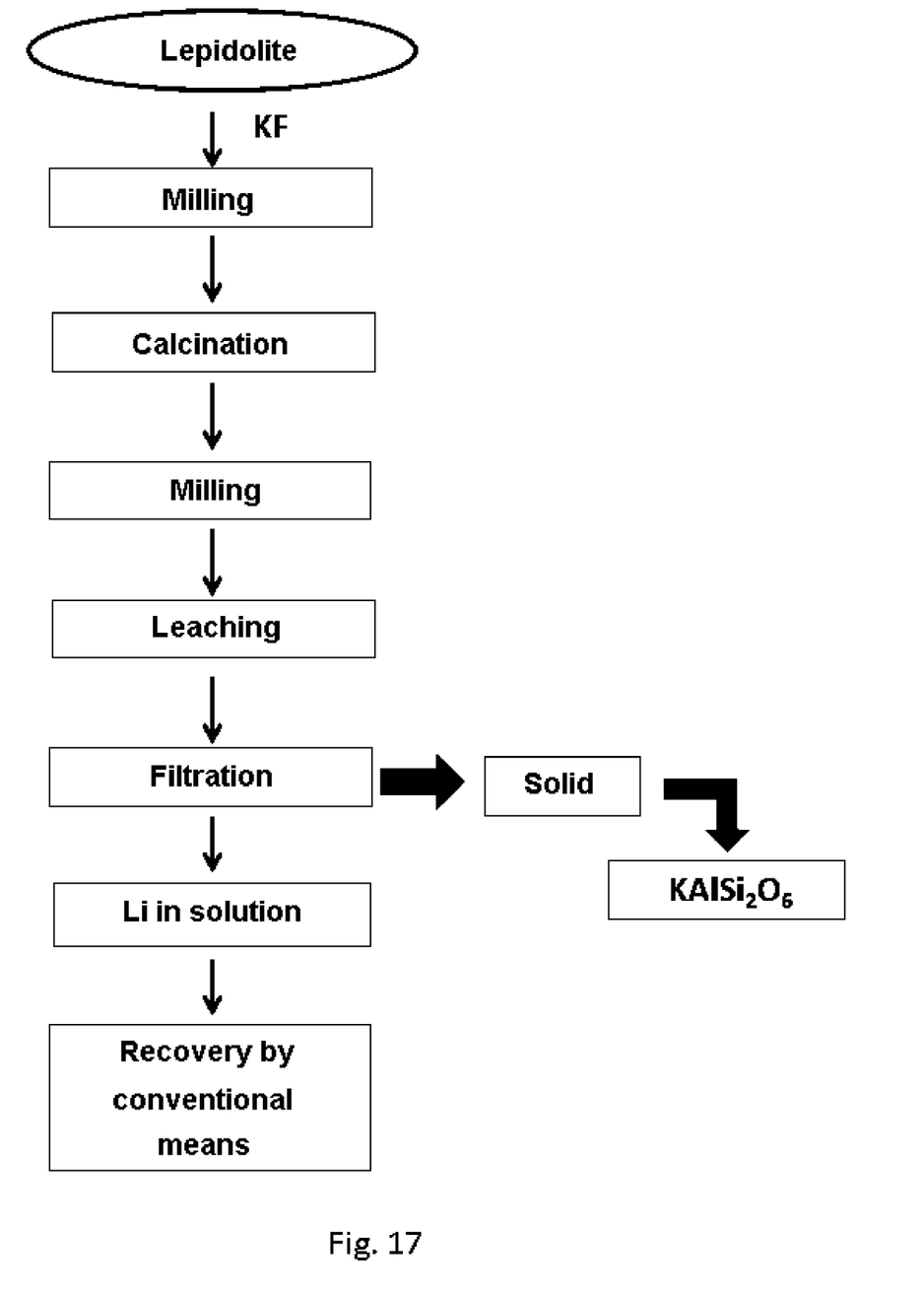
FIG. 17 shows the flow chart for the process using KF with lepidolite.
Figure 18:
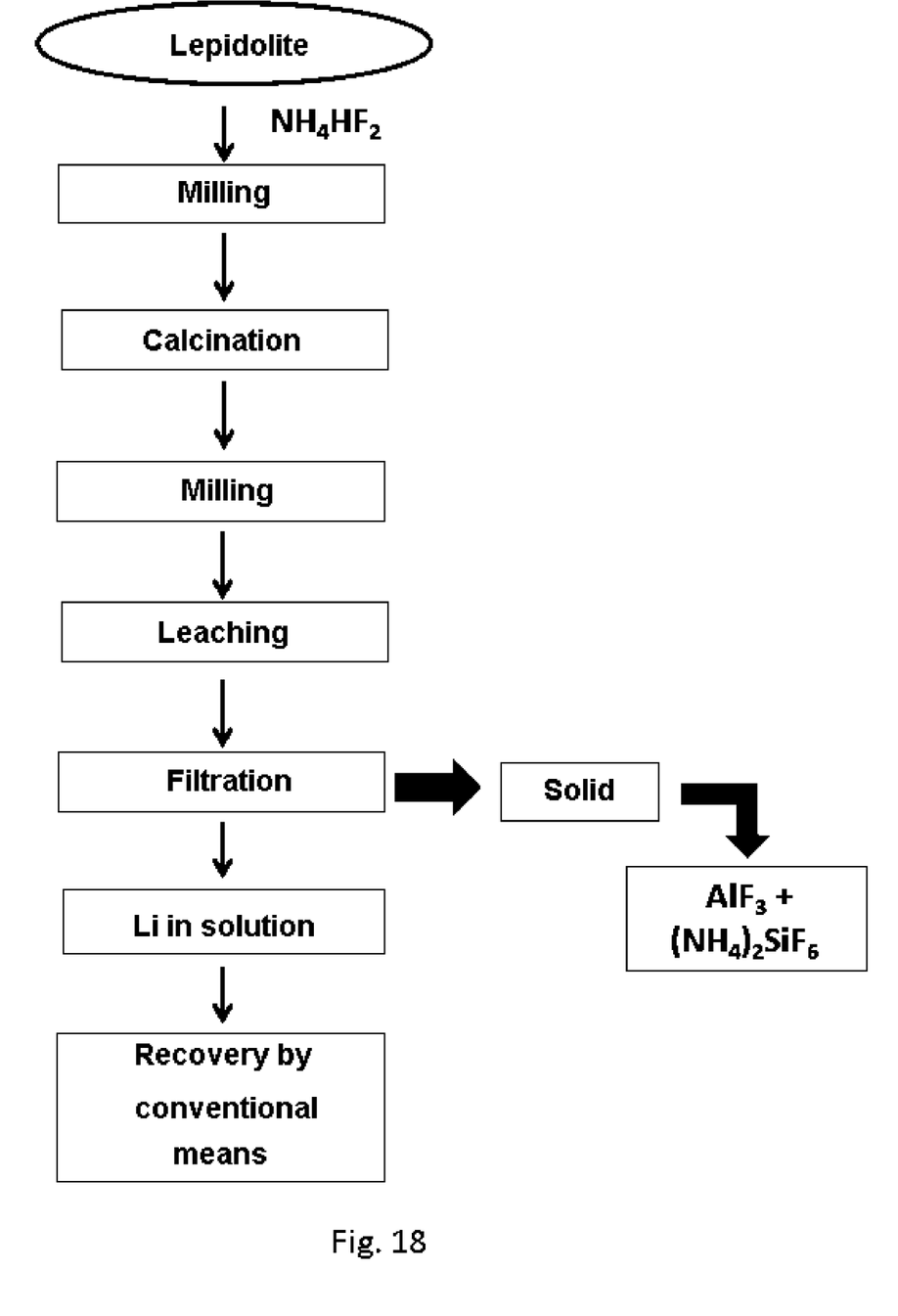
FIG. 18 shows the flow chart for the process using $NH_4HF_2$ with lepidolite.

In FIG. 12 shows that upon decreasing the concentration of $H_2SO_4$ a decrease in the Li extraction percentage is not detected. The maximum extraction achieved was 98% working with 5% $H_2SO_4$. In all the experiments the reaction time does not have a strong influence on the extraction reaction should be noted.

EXAMPLES

Example 1 (α-Spodumene:NaF)

142.85 g α-spodumene (6.5% $Li_2O$) and 57.15 g sodium fluoride were mixed (molar ratio 1:2, respectively) during 15 minutes in rod mills. Then, the solid mixture was placed in a ceramic crucible and calcined during 2 hours at 700° C., in a muffle, obtaining a LiF formation or mineral conversion at 91%. Next, the calcined sample was leached during one hour with 600 mL sulfuric acid solution at 10% v/v. Afterwards, the mixture was filtered separating the solid residues from the leaching solution, at the latter the lithium was quantified by flame photometry, obtaining a total value of lithium extraction of 85%.

Example 2 (α-Spodumene:NaF)

136.06 g α-spodumene (6.5% $Li_2O$) and 63.94 g sodium fluoride were mixed (molar ratio 1:2) during 15 minutes in rod mills. Then, the solid mixture was placed in a ceramic crucible and calcined during 2 hours at 700° C., in a muffle, obtaining a conversion of 92%. Next, the calcined sample was leached during one hour with 600 mL sulfuric acid solution at 20% v/v. Finally, filtered separating the solid residues from the lithium solution and determined thereof by flame photometry, obtaining a total lithium extraction of 89%.

Example 3 (α-Spodumene:NaF)

136.06 g α-spodumene (6.5% $Li_2O$) and 63.94 g sodium fluoride were mixed (molar ratio 1:2) during 15 minutes in rod mills. Then, the solid mixture was placed in a ceramic crucible and calcined during 2 hours at 700° C., in a muffle, obtaining a conversion of 92%. Next, the calcined sample was leached during one hour with 600 mL sulfuric acid solution at 7.5%. Finally, the mixture was filtered separating the solid residues from the leaching solution. In the latter lithium was determined by flame photometry, obtaining a total lithium extraction of 68%.

Example 4 (α-Spodumene:KF)

The mineral sample was milled in rod mills during 15 minutes. From this, 142.85 g α-spodumene (6.5% $Li_2O$) and 57.15 g potassium fluoride were mixed (molar ratio 1:1.3) during 15 minutes in rod mills. Then, the solid mixture was placed in a ceramic crucible and calcined during 2 hours at 700° C., in a muffle, obtaining a conversion of 93%. Next, the calcined sample was leached during one hour with 600 mL sulfuric acid solution at 10% v/v. Finally, the mixture was filtered separating the solid residues from the leaching solution, in the latter lithium was determined by flame photometry, obtaining a total lithium extraction of 85%.

Example 5 (α-Spodumene:$NH_4HF_2$ 142 g α-spodumene (6.5% $Li_2O$) and 409 g ammonium biflouride were mixed (molar ratio 1:9.5) during 15 in rod mills. Then, the solid mixture was placed in a ceramic crucible coated with aluminum and the content calcined during 2 hours at 230° C., in a muffle, to form LiF the mineral conversion was 95%. Next, the calcined sample was leached during one hour with 600 mL sulfuric acid solution at 10% v/v. Afterwards, the mixture from the previous step was filtered separating the solid residues from the leaching solution, in the latter lithium was quantified by flame photometry, obtaining a total lithium extraction value of 65%.

Example 6 (Lepidolite:NaF)

130 g lepidolite (4% $Li_2O$) and 40 g sodium fluoride were mixed (molar ratio 1:2) during 15 minutes in rod mills. The solid mixture was placed in a ceramic crucible and calcined during 2 hours at 700° C., in a muffle, obtaining a conversion of 90%. Next, the calcined was leached during one hour with 600 mL sulfuric acid solution at 7.5%. Finally, the mixture was filtered separating the solid residues from the leaching solution, then in the latter lithium was determined by flame photometry, obtaining a total lithium extraction of 75%.

Example 7 (Lepidolite:KF)

130 g lepidolite (4% $Li_2O$) and 50 g potassium fluoride were mixed (molar ratio 1:2) during 15 minutes in rod mills. The reactive mixture was placed in a ceramic crucible and calcined during 2 hours at 700° C., in a muffle, obtaining a conversion of 90%. Next, the calcined was leached during one hour with 600 mL sulfuric acid solution at 7.5%. Finally, the mixture was filtered separating the solid residues from the leaching solution, then in the latter lithium was determined by flame photometry, obtaining a total lithium extraction of 80%.

Example 8 (Lepidolite:$NH_4HF_2$ 130 g lepidolite (4% $Li_2O$) and 450 g ammonium biflouride were mixed (molar ratio 1:9.5) during 15 in rod mills. The reactive mixture was placed in a ceramic crucible coated with aluminum and calcined during 2 hours at 230° C., in a muffle, obtaining a conversion of 90%. Next, the calcined was leached during one hour with 600 mL sulfuric acid solution at 7.5%. Finally, the mixture was filtered separating the solid residues from the leaching solution, then in the latter lithium was determined by flame photometry, obtaining a total lithium extraction of 86%.

The invention claimed is:

1. Pyrometallurgic process to obtain lithium compounds and intermediaries, comprising the steps of
    a) contacting particles of at least a lithium aluminosilicate with at least a solid fluorine solid compound, selected from the group consisting of NaF, KF or $NH_4HF_2$;
    b) heating until a temperature of 120° C. to 900° C. obtaining as a product of the reaction a solid mixture comprising at least a compound of the group consisting in lithium fluoride (LiF), albite ($NaAlSi_3O_8$), nepheline ($NaAlSiO_4$), leucite ($KAlSi_2O_6$), aluminum fluoride ($AlF_3$) and ammonium hexafluorosilicate (($NH_4)_3SiF_6$);
    c) carrying out a leaching process with distilled water of the mixture of step b) to eliminate excess fluorinating agent, NaF, KF or $NH_4HF_2$, and subsequently filter and dry; and
    d) carrying out at least the leaching process of the solid mixture obtained in step c) using as leaching agents compounds selected from the group consisting of sodium hydroxide (NaOH), calcium chloride ($CaCl_2$), sulfuric acid ($H_2SO_4$) and subsequently filter and dry.

2. Process according to claim 1, wherein at least a lithium aluminosilicate is α-spodumene, lepidolite or a combination thereof.

3. Process according to claim 1, wherein in step a) the aluminosilicate particles comprise a size between 29 and 200 μm.

4. Process according to claim 1, wherein the heating of step b) is carried out for a time of 30 to 300 min.

5. Process according to claim 1, wherein the fluorine solid compound is NaF, and the molar ratio aluminosilicate:NaF is between 1:1 and 1:2.5.

6. Process according to claim 1, wherein the fluorine solid compound is KF, and the molar ratio aluminosilicate:KF is between 1:1 and 1:2.5.

7. Process according to claim 1, wherein the fluorine solid compound is $NH_4HF_2$, and the molar ratio aluminosilicate:$NH_4HF_2$ is between 1:3.0 and 1:19.

* * * * *